(12) United States Patent
Auer et al.

(10) Patent No.: US 10,264,472 B2
(45) Date of Patent: Apr. 16, 2019

(54) COMBINING UPLINK RADIO SIGNALS

(71) Applicant: Telefonaktiebolaget LM Ericsson (publ), Stockholm (SE)

(72) Inventors: Gunther Auer, Stockholm (SE); Tsao-Tsen Chen, Täby (SE); Mattias Frenne, Uppsala (SE); Fredric Kronestedt, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 9 days.

(21) Appl. No.: 15/543,163

(22) PCT Filed: Feb. 10, 2015

(86) PCT No.: PCT/EP2015/052671
§ 371 (c)(1),
(2) Date: Jul. 12, 2017

(87) PCT Pub. No.: WO2016/128023
PCT Pub. Date: Aug. 18, 2016

(65) Prior Publication Data
US 2018/0007562 A1   Jan. 4, 2018

(51) Int. Cl.
*H04W 4/00* (2018.01)
*H04W 16/32* (2009.01)
*H04W 88/08* (2009.01)

(52) U.S. Cl.
CPC .......... *H04W 16/32* (2013.01); *H04W 88/085* (2013.01)

(58) Field of Classification Search
CPC ............................ H04W 16/32; H04W 88/085
(Continued)

(56) References Cited

U.S. PATENT DOCUMENTS

| 9,474,010 B2 * | 10/2016 | Kazmi | H04W 40/244 |
| 2013/0051240 A1 * | 2/2013 | Bhattad | H04L 5/005 370/241 |

(Continued)

FOREIGN PATENT DOCUMENTS

| WO | 2011156465 A1 | 12/2011 |
| WO | 2014040608 A1 | 3/2014 |

OTHER PUBLICATIONS

Bertrand, Pierre, "Channel Gain Estimation from Sounding Reference Signal in LTE," IEEE 73rd Vehicular Technology Conference (VTC), May 15-18, 2011, Yokohama, Japan, IEEE, 5 pages.

(Continued)

*Primary Examiner* — Chuong T Ho
(74) *Attorney, Agent, or Firm* — Sage Patent Group

(57) ABSTRACT

It is presented a method for controlling remote radio head contribution by a plurality of remote radio heads in at least one combiner. The method is comprises: obtaining a number of available baseband processor devices for uplink processing; connecting uplink signals from a set of remote radio heads in each one of the combiners; determining a respective radio channel measurement for uplink radio communication from a first wireless device; repeating the connecting and determining until radio channel measurements have been determined for all of the plurality of remote radio heads; selecting a first subset of at least one remote radio head from the plurality of remote radio heads for receiving radio communication from the first wireless device; and reducing an uplink contribution from at least one remote radio head, of the plurality of remote radio heads, which is not part of the first subset.

22 Claims, 5 Drawing Sheets

(58) Field of Classification Search
USPC .............. 370/328, 329, 330, 241; 455/456.1
See application file for complete search history.

(56) References Cited

U.S. PATENT DOCUMENTS

| | | |
|---|---|---|
| 2013/0128760 A1 | 5/2013 | Fujishima et al. |
| 2015/0312840 A1* | 10/2015 | Kazmi ................ H04W 40/244 455/456.2 |
| 2016/0088581 A1* | 3/2016 | Lorenz .............. H04W 56/0065 455/456.1 |
| 2018/0188350 A1* | 7/2018 | Skarby .................. H04W 64/00 |

OTHER PUBLICATIONS

Potevio, "R1-112582: Considerations on RRH subset selection mechanism," 3rd Generation Partnership Project (3GPP), TSG RAN WG1 Meeting #66 , Aug. 22-26, 2011, 3 pages, Athens, Greece.

International Search Report and Written Opinion for International Patent Application No. PCT/EP2015/052671, dated Oct. 9, 2015, 10 pages.

* cited by examiner

COMBINING UPLINK RADIO SIGNALS

This application is a 35 U.S.C. § 371 national phase filing of International Application No. PCT/EP2015/052671, filed Feb. 10, 2015, the disclosure of which is incorporated herein by reference in its entirety.

TECHNICAL FIELD

The invention relates to a method, a remote radio head controller, a computer program and a computer program product for controlling remote radio head contribution by a plurality of remote radio heads.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient coverage with smaller cells to provide better capacity.

However, when the cells get too small, wireless devices moving in the network cause a great number of handovers which causes significant overhead. Moreover, providing coverage indoors using many small cells can be quite costly, with a radio base station for each such small cell.

One solution to this problem is to use remote radio heads, where several remote radio heads connected to the same radio base station share the same cell. In this way, a single radio base station can provide coverage in different parts of the building by placing the remote radio heads appropriately. Moreover, the wireless device can move between the coverage of different remote radio heads while staying within the same cell, thus avoiding causing handovers. The wireless device will not realize that it is served by different remote radio heads, but see it as one single cell.

When uplink signals from the remote radio heads are in the analogue domain, and these are combined in a combiner, this combination can occur coherently or non-coherently. In coherent combining, phases of the distorted desired signals are aligned prior to combining by multiplying the distorted desired signals with conjugates of respective channel estimations, increasing the signal-to-interference plus noise-ratio (SINR) of the combined signal. Several combining algorithms are available for coherent combining, including maximum-ratio combining (MRC), equal-gain combining, etc. On the other hand, for non-coherent combining, there is no phase alignment for the distorted desired signals, and the combined signal is simply the sum of all received signals. Therefore, the SINR in linear domain of the non-coherently combined signal will be equal to a linear combination, or a weighted average, of the SINRs of individual received signals.

Hence, for non-coherent combining, when one or several remote radio heads receive strong interference, the overall SINR is substantially degraded.

SUMMARY

It is an object to reduce contribution of remote radio heads where interference is high.

According to a first aspect, it is presented a method for controlling remote radio head contribution by a plurality of remote radio heads in at least one combiner. The method is performed in a remote radio head controller and comprises the steps of: obtaining a number of available baseband processor devices for uplink processing, each available baseband processor device being connected to at least one of the at least one combiner; connecting uplink signals from a set of zero or more remote radio heads in each one of the at least one combiner; determining a respective radio channel measurement for uplink radio communication from a first wireless device via the at least one combiner; repeating the steps of connecting and determining until radio channel measurements for uplink communication from the wireless device have been determined for all of the plurality of remote radio heads; selecting a first subset of at least one remote radio head from the plurality of remote radio heads for receiving radio communication from the first wireless device; and reducing an uplink contribution from at least one remote radio head, of the plurality of remote radio heads, which is not part of the first subset.

The step of reducing an uplink contribution may comprise blocking any uplink contribution from the at least one remote radio head which is not part of the first subset of at least one remote radio head.

In the step of connecting, the set may comprise at most one remote radio head.

The step of selecting may comprise including, in the first subset, only remote radio heads for which the radio channel measurements are better than a threshold value.

The step of selecting may comprise including the remote radio head for which the radio channel measurement is the best.

The step of determining a respective radio channel measurement may further comprise determining a respective radio channel measurement for uplink radio communication from a second wireless device via the at least one combiner. In such a case, the step of selecting a first subset of at least one remote radio head comprises selecting a joint subset of at least one remote radio head for receiving radio communication from both the first wireless device and the second wireless device.

The step of selecting a first subset of at least one remote radio head may comprise including all of the plurality of remote radio heads in the first subset for a period when uplink random access reception is enabled.

The method may further comprise the step of: connecting a number of remote radio heads, corresponding to the number of available baseband processor devices, for which the radio channel measurements are best to respective baseband processor devices.

The method may further comprise the steps of selecting a second subset of at least one remote radio head from the plurality of remote radio heads for transmitting radio communication to the first wireless device; and reducing a downlink contribution using at least one remote radio head, of the plurality of remote radio heads, which is not part of the second subset.

The first subset and the second subset may be identical.

According to a second aspect, it is presented a remote radio head controller for controlling an uplink contribution for combining uplink radio signals from a plurality of remote radio heads in at least one combiner. The remote radio head controller comprises: a processor; and a memory storing instructions that, when executed by the processor, causes the remote radio head controller to: obtain a number of available baseband processor devices for uplink processing, each available baseband processor device being connected to at least one of the at least one combiner; connect uplink signals from a set of zero or more remote radio heads in each one of the at least one combiner; determine a respective radio channel measurement for uplink radio communication from the first wireless device via the at least one combiner; repeat the instructions to connect and determine until radio channel measurements for uplink communication from the wireless device have been determined for all of the plurality of remote radio heads; select a first subset of at least one remote radio head from the plurality of remote radio heads for receiving radio communication from the first wireless device; and reduce an uplink contribution from at least one remote radio head, of the plurality of remote radio heads, which is not part of the first subset.

The instructions to reduce an uplink contribution may comprise instructions that, when executed by the processor, causes the remote radio head controller to block any uplink contribution from the at least one remote radio head which is not part of the first subset.

The set may comprises at most one remote radio head.

The instructions to select may comprise instructions that, when executed by the processor, causes the remote radio head controller to include, in the first subset, only remote radio heads for which the radio channel measurement is better than a threshold value.

The instructions to select may comprise instructions that, when executed by the processor, cause the remote radio head controller to include the remote radio heads for which the radio channel measurements are the best.

The instructions to determine a respective radio channel measurement may comprise instructions that, when executed by the processor, cause the remote radio head controller to determine a respective radio channel measurement for uplink radio communication from a second wireless device via the at least one combiner. In such a case, the instructions to select a first subset of at least one remote radio head comprise instructions that, when executed by the processor, cause the remote radio head controller to select a joint subset of at least one remote radio head for receiving radio communication from both the first wireless device and the second wireless device.

The instructions to select a first subset may comprise instructions that, when executed by the processor, cause the remote radio head controller to include all of the plurality of remote radio heads in the first subset for a period when uplink random access reception is enabled.

The remote radio head controller may further comprise instructions that, when executed by the processor, cause the remote radio head controller to connect a number of remote radio heads, corresponding to the number of available baseband processor devices, for which the radio channel measurements are best to respective baseband processor devices.

The remote radio head controller may further comprise instructions that, when executed by the processor, cause the remote radio head controller to: select a second subset of at least one remote radio head from the plurality of remote radio heads for transmitting radio communication to the first wireless device; and reduce a downlink contribution using at least one remote radio head, of the plurality of remote radio heads, which is not part of the second subset.

The first subset and the second subset may be are identical.

According to a third aspect, it is presented a remote radio head controller comprising: means for obtaining a number of available baseband processor devices for uplink processing, each available baseband processor device being connected to at least one of the at least combiner, each connected to one or more remote radio heads; means for connecting uplink signals from a set of zero or more remote radio heads in each one of the at least one combiner; means for determining a respective radio channel measurement for uplink radio communication from a first wireless device via the at least one combiner; means for repeating the connecting and determining until radio channel measurements for uplink communication from the wireless device have been determined for all of the plurality of remote radio heads; means for selecting a first subset of at least one remote radio head from the plurality of remote radio heads for receiving radio communication from the first wireless device; and means for reducing an uplink contribution from at least one remote radio head, of the plurality of remote radio heads, which is not part of the first subset.

According to a fourth aspect, it is presented a computer program for controlling remote radio head contribution by a plurality of remote radio heads in at least one combiner. The computer program comprises computer program code which, when run on a remote radio head controller, causes the remote radio head controller to: obtain a number of available baseband processor devices for uplink processing, each available baseband processor device being connected to at least one of the at least one combiner; connect uplink signals from a set of zero or more remote radio heads in each one of the at least one combiner; determine a respective radio channel measurement for uplink radio communication from the first wireless device via the at least one combiner; repeat the computer program code to connect and determine until radio channel measurements for uplink communication from the wireless device have been determined for all of the plurality of remote radio heads; select a first subset of at least one remote radio head from the plurality of remote radio heads for receiving radio communication from the first wireless device; and reduce an uplink contribution from at least one remote radio head, of the plurality of remote radio heads, which is not part of the first subset.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
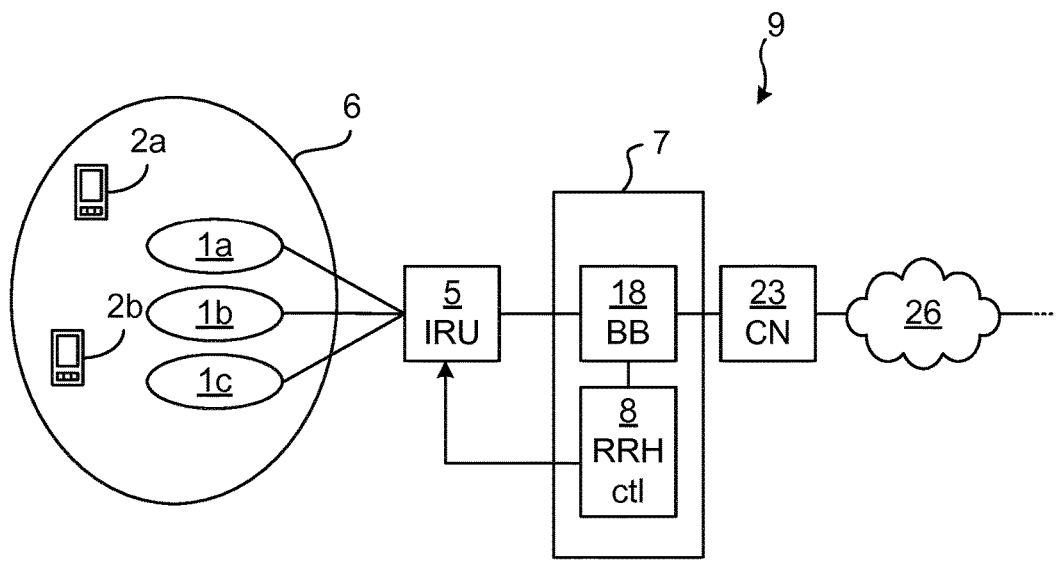
FIG. 1 is a schematic architecture diagram illustrating an environment where embodiments presented herein can be applied.

FIG. 1 is a schematic architecture diagram illustrating an environment where embodiments presented herein can be applied. A wireless communication network 9 comprises a number of remote radio heads (RRHs) 1a-c for installation in locations where traditional deployment with antennas being co-located with the base stations is not ideal. For example, the wireless communication network 9 can be installed indoors, such as in an office, shopping centre, train station or airport.

It is to be noted that, while the embodiments presented herein are described as implemented using LTE (Long Term Evolution) and/or W-CDMA (Wideband Code Division Multiplex), any applicable communication standard may be used, such as any one or a combination of LTE-SAE (Long Term Evolution-System Architecture Evolution), GSM (Global System for Mobile communication), EDGE (Enhanced Data Rates for GSM Evolution), GPRS (General Packet Radio Service), CDMA2000 (Code Division Multiple Access 2000), or any other current or future wireless network, such as LTE-Advanced, as long as the principles described hereinafter are applicable.

A base station 7 here comprises a baseband processor device (BBP) 18 and a remote radio head controller 8. A combiner 5 is used in the uplink to combine uplink signals from a plurality of remote radio heads 1a-c and forward data to the baseband processor device 18. In downlink, the combiner 5 may function as a splitter, providing downlink signals from the baseband processor device 18 to each one of the connected remote radio heads 1a-c. The combiner 5 is also known as an indoor radio unit (IRU). It is to be noted though that the combiner may also be provided outdoors whenever appropriate. The combiner is in this way a link for a number (in this example three) of remote radio heads 1a-c. In this way, the base station 7 is a link for uplink and downlink communication for the remote radio heads connected to the combiner 5. One function of the base station 7 is to function as a digital unit (DU), using the one or more baseband processor devices 18, for processing uplink and downlink signals in the digital domain.

It is to be noted that the combiner 5 can be provided separate from the base station 7 as shown in FIG. 1, but the combiner 5 can also be provided as part of the base station 7.

The base station 7 is also connected to a core network 23. The core network 23 provides central functions and connectivity to external networks 26 such as the Internet.

The remote radio heads 1a-c connected to the combiner 5 are part of a single radio cell 6 and thus share a cell identifier. Antennas do not need to be included in this embodiment of the base station 7 or the combiner 5, as the remote radio heads 1a-c provide the antennas for the wireless link to one or more wireless devices 2a-b. The wireless link provided by the remote radio heads 1a-c includes both downlink (DL) communication to the wireless devices 2a-b and uplink (UL) communication from the wireless devices 2a-b. The term wireless device is also known as mobile communication terminal, user equipment (wireless device), station (STA), mobile terminal, user terminal, user agent, machine-to-machine devices etc., and can be, for example, what today is commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the combiner 5 and the remote radio heads 1a-c.

It is to be noted that the processing of uplink and downlink signals in the combiner and the remote radio heads 1a-c do not need to occur in the digital domain and can be (but do not need to be) performed completely in the analogue domain.

The remote radio heads 1a-c convert from IF to RF for downlink transmission and from RF to IF for uplink reception. Conversely, the combiner 5 converts from digital BB to IF for downlink transmission and from IF to digital BB for uplink reception.

By using IF instead of RF over the cables between the combiner 5 and the remote radio heads 1a-c, cheaper, widely deployed electrical cables can be used, such as Ethernet LAN cabling. In this way, existing indoor cabling can many times be reused during installation, which significantly saves cost, installation time and complexity. Optionally, the remote radio heads 1a-c are also powered over the respective cables.

The transmission and reception is under the control of the MAC (Media Access Control) scheduler in the baseband module 18. The MAC scheduler informs what transmissions should be made and informs, via the downlink signaling, the wireless devices when to transmit and on which frequency and power.

The link between the combiner 5 and the baseband processor device 18 utilises a digital signal interface, such as CPRI (Common Public Radio Interface).

The remote radio head controller 8 controls how the uplink signals from the remote radio heads 1a-c are combined in the combiner 5, as described in more detail below. Specifically, contribution via remote radio heads with poor radio characteristics can be reduced.

It is to be noted that, although FIG. 1 shows the baseband module 18 connected to one combiner 5, each baseband module 18 can be connected to several combiners over a separate link.

It is to be noted that while the embodiment of FIG. 1 shows three remote radio heads 1a-c, there may be fewer or more remote radio heads connected to each combiner 5.

Figure 2:
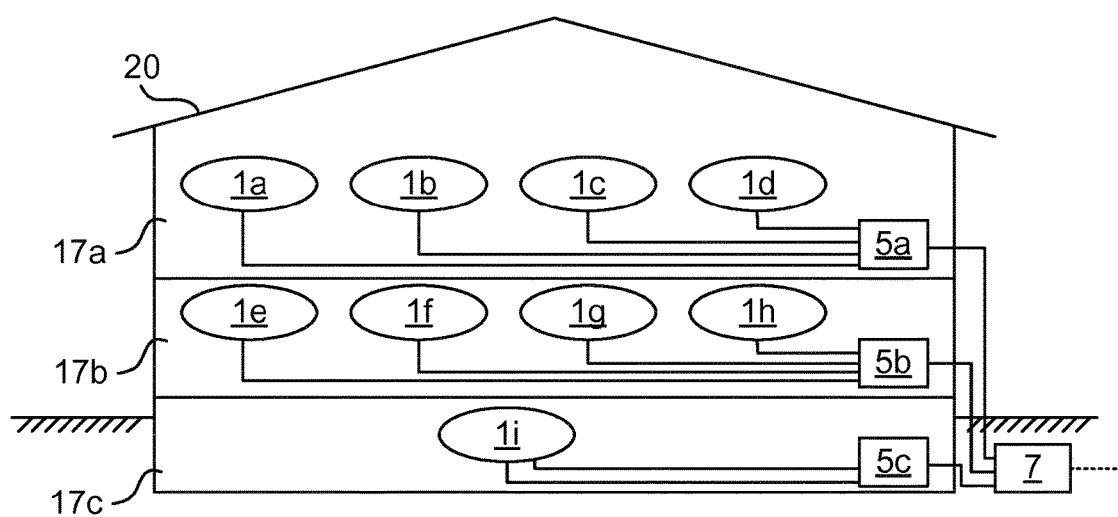
FIG. 2 is a schematic diagram illustrating an example deployment of remote radio heads of FIG. 1 in a multi-story building.

FIG. 2 is a schematic diagram illustrating an example deployment of remote radio heads in a multi-story building 20. The building 20 here has a first floor 17a, a ground floor 17b and a basement 17c. On the first floor 17a, there are a first remote radio head 1a, a second remote radio head 1b, a third remote radio head 1c and a fourth remote radio head 1d, all connected to a first combiner 5a. On the ground floor 17b, there are a fifth remote radio head 1e, a sixth remote radio head 1f, a seventh remote radio head 1g and an eighth remote radio head 1h all connected to a second combiner 5b. In the basement 17c, there is only a ninth remote radio head ii connected to a third combiner 5c. Each one of the combiners 5a-c is connected to the base station (and its one or more baseband processing devices) via a respective digital (e.g. CPRI) link.

Figure 3:
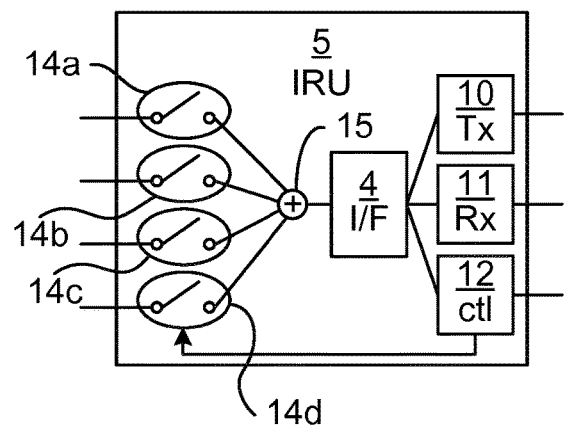
FIG. 3 is a schematic diagram illustrating components of an embodiment of an indoor radio unit of FIG. 1.

FIG. 3 is a schematic diagram illustrating components of an embodiment of a combiner of FIG. 1. The combiner and its components will now be explained in a context of uplink and downlink communication using a remote radio head.

For uplink communication, the remote radio heads downconvert a received (uplink) signal to IF and send it over its cable to the combiner 5. The received IF signals from several remote radio heads are combined in a combiner unit 15 and fed to an interface circuitry 4. The interface circuitry 4 extracts the received IF signal from the interface and forwards it to the RX (reception) back-end 11. In one embodiment, the RX backend 11 comprises an analogue to digital (A/D) converter which samples the signal on IF and converts to a digital signal. In another embodiment, the RX back-end 11 first downconverts the received signals from IF to an analogue BB (baseband) signal which is further filtered and converted to a digital signal in an A/D converter. The RX back-end 11 sends the combined received signals in digital form (e.g. over CPRI) to the baseband processing device for further processing such as radio channel measurement, demodulation, decoding, etc. as known in the art per se.

Prior to combining in the combiner unit 15, there is a respective switch 14a-d on each connection to a remote radio head. The switches 14a-d are controllable by the controller 12 to thereby block or allow uplink contribution from zero, one or more of the connected remote radio heads. Optionally, the switches 14a-d are controllable to reduce contribution without blocking, by attenuating the uplink signal.

For downlink communication, the process works in reverse to the uplink. Hence, the baseband module sends a digital BB signal for transmission to a TX (transmission) back-end 10 of the combiner 5. In one embodiment, the TX back-end 10 converts the digital BB signal to an analogue signal in IF directly in a digital to analogue (D/A) converter. In another embodiment, the TX back-end 10 first converts the digital BB signal to an analogue transmission signal and upconverts the transmission signal to IF in the analogue domain. The transmission signal in IF is then inserted onto the interface by the interface circuitry 4, and provided to the combiner unit 15 which also functions as a splitter, providing the same transmission signal in IF to all connected remote radio heads over the respective cables. The remote radio heads then upconvert the IF signal to RF and transmit the RF signal over the air to the wireless devices 2a-b.

Moreover, there is a control link between a controller 12 in the combiner 5 and each remote radio head. This control link can be used e.g. to control the switches 14a-d.

Figure 4:
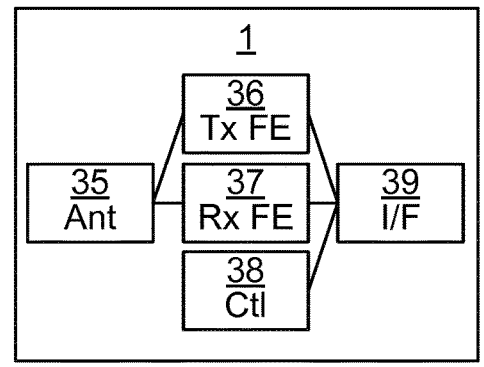
FIG. 4 is a schematic architecture diagram illustrating components of an embodiment of a remote radio head of FIG. 1.

FIG. 4 is a schematic architecture diagram illustrating components of an embodiment of a remote radio head of FIG. 1, here represented by a single remote radio head 1. The remote radio head comprises an interface circuitry 39, a transmission front-end 36, a reception front-end 37, a controller 38 and an antenna device 35. It is to be noted that the antenna device 35 may comprise any number of antenna, e.g. one, two, four, six, eight, etc. When two or more antennas are used, MIMO (Multiple Input Multiple Output) can be employed. It should also be noted that a remote radio head may also support TDD/FDD operation and multi-band operation.

In line with what is explained above, the RX Front End 37 downconverts received signals in RF to IF for transfer over the cable to the combiner 5. Moreover, the TX Front End 36 upconverts transmission signals from IF, as received over the cable from the combiner 5 to RF for transmission to wireless devices.

The antenna device 35 may comprise one or more antenna elements for each antenna. Particularly, the antenna can comprise one or more antenna elements in a first polarisation and one or more antenna elements in a second polarisation to achieve an additional dimension of orthogonality. The two polarisations may be controlled separately. The antenna device 35 may also comprise appropriate filters to filter out unwanted signals.

The interface circuitry 39 inserts and extracts (multiplexes and demultiplexes) the transmission IF signal, the received IF signal and the control signal onto/from the cable. The interface circuitry 39 may use different frequency bands for uplink signals, downlink signals and control signals to thereby multiplex all of these on a single cable.

A controller 38 communicates with the controller 12 of the combiner. The controller 38 can be implemented using software instructions such as a computer program executed by a processor and/or using only hardware, such as application specific integrated circuits, field programmable gate arrays, discrete logical components, etc.

Figure 5:
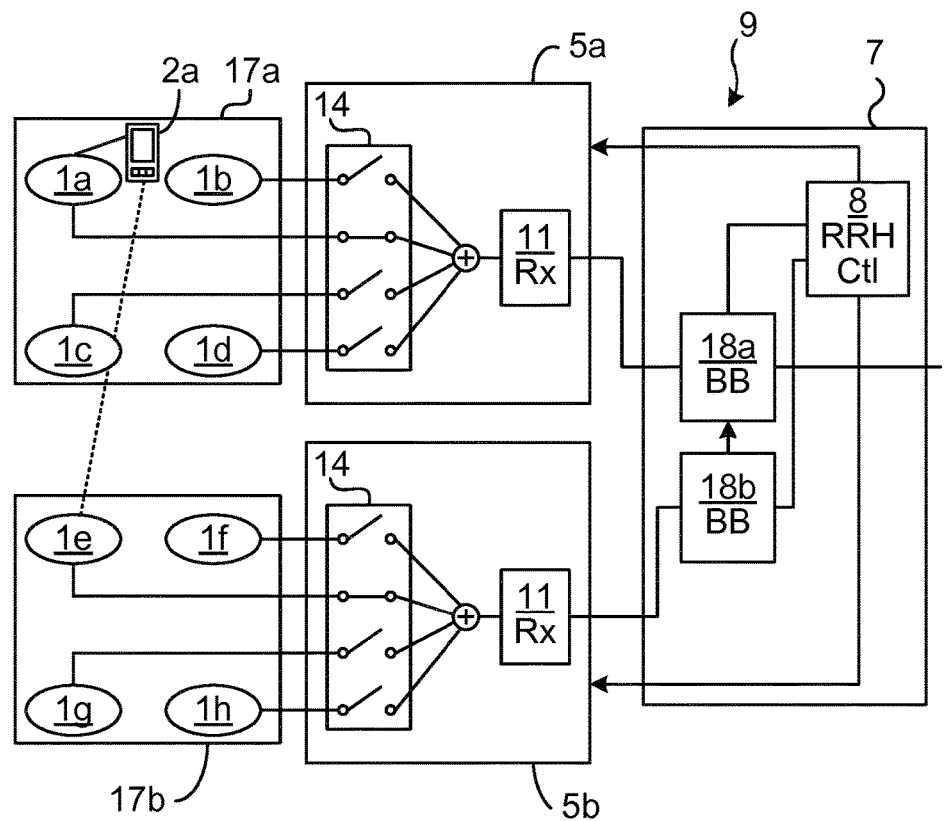
FIG. 5 is a schematic architecture diagram illustrating an embodiment of uplink combining in an environment corresponding to that of FIG. 1.

FIG. 5 is a schematic architecture diagram illustrating an embodiment of remote radio head contribution in an environment corresponding to that of FIG. 1. Here there is a first baseband processor device 18a and a second baseband processor device 18b. The first baseband processor device 18a is connected to a first combiner 5a and the second baseband processor device 18b is connected to a second combiner 5b. The first combiner 5a is responsible for a first area, e.g. the first floor 17a of a building and is connected to first remote radio head 1a, a second remote radio head 1b, a third remote radio head 1c and a fourth remote radio head 1d. The second combiner 5b is responsible for a second area, e.g. the ground floor 17b of a building and is connected to a fifth remote radio head 1e, a sixth remote radio head 1f, a seventh remote radio head 1g and an eighth remote radio head 1h. Each one of the first and second combiners 5a-b comprise a set of switches 14, for individual control of remote radio head contribution by respectively connected remote radio heads. This contribution can be controlled both in uplink and downlink.

The remote radio head controller 8 controls the switches 14 via a control link to each one of the first combiner 5a and the second combiner 5b.

A first wireless device 2a is served by a cell with the eight remote radio heads 1a-h. Some remote radio heads will have better radio channel and/or interference conditions with the wireless device and individual SINRs of the received signals from the wireless device are larger at these remote radio heads. On the other hand, other remote radio heads will have worse radio channel and/or interference conditions with the wireless device, and individual SINRs of the received signals from the wireless device are smaller at these remote radio heads. Since combined SINR of the non-coherently combined signal in the combiner is equal to a weighted average of individual SINRs of received signals from all remote radio heads, uplink performance will be significantly degraded if the difference between the highest individual SINR and lowest individual SINR is very large. That is, uplink performance will be significantly degraded if individual SINRs are very low at some remote radio heads.

However, according to embodiments presented herein and described in more detail below, measurements are determined for each individual remote radio head for a particular wireless device. Using these measurements, the switches 14 are configured so that only remote radio heads with good performance contribute. For instance in the uplink, the first wireless device 2a is here close to the first remote radio head 1o on the first floor, but also to the fifth remote radio head 1o on the ground floor. This is detected by determining the measurements for the remote radio heads for the first wireless device, whereby the switch 14 of the first combiner 5a is configured to only allow uplink contribution from the first remote radio head. Analogously, the switch 14 of the second combiner 5b is configured to only allow uplink contribution from the fifth remote radio head. In this way, uplink signals from the first wireless device 2a are received with high SINR.

Figure 6:
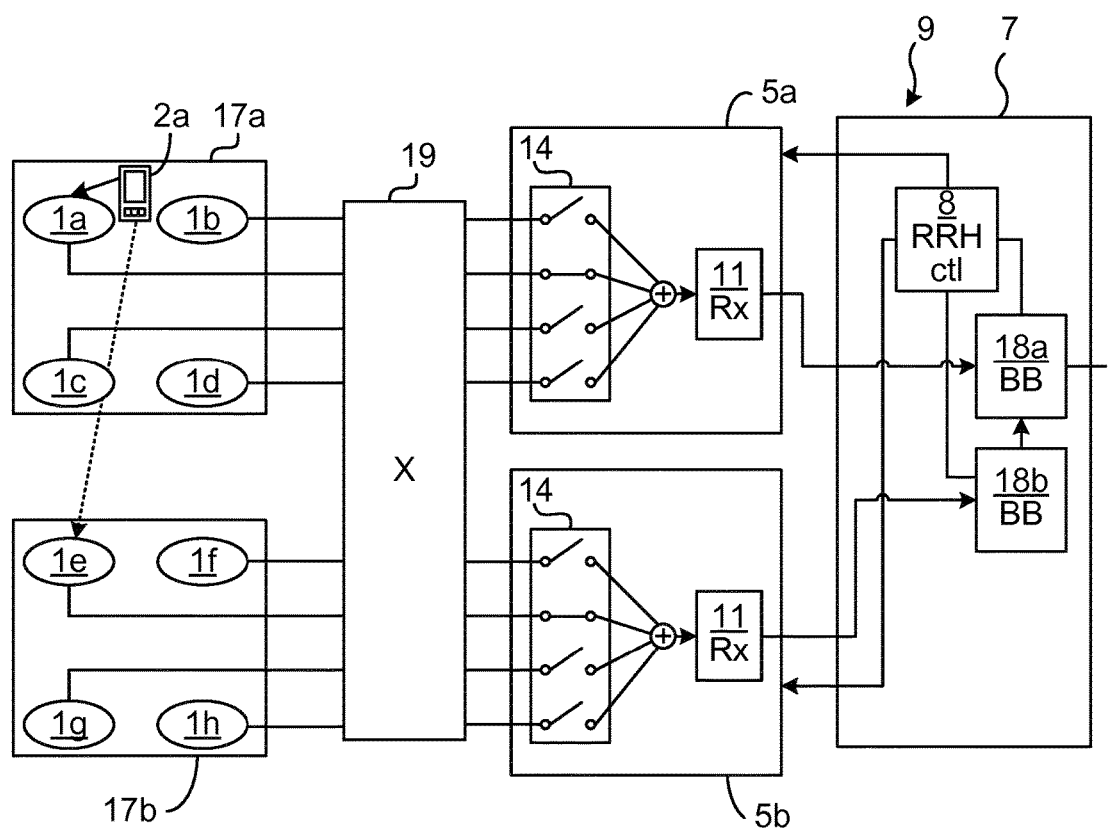
FIG. 6 is a schematic architecture diagram illustrating an embodiment of uplink combining in an environment corresponding to that of FIG. 1.

FIG. 6 is a schematic architecture diagram illustrating an embodiment of remote radio head contribution in an environment corresponding to that of FIG. 1. The embodiment shown here is similar to the embodiment of FIG. 5. Here, however, there is a cross switch 19 provided between the remote radio heads 1a-h and the combiners 5a-b. The cross switch 19 is controllable such that any remote radio head 1a-h can be connected to any connection on the combiners 5a-b. Optionally, the cross switch 19 can also block (or attenuate) contribution to or from any of the remote radio heads, in which case the sets of switches 14 of the combiners 5a-b can be dispensed with.

Figures 7A, 7B:
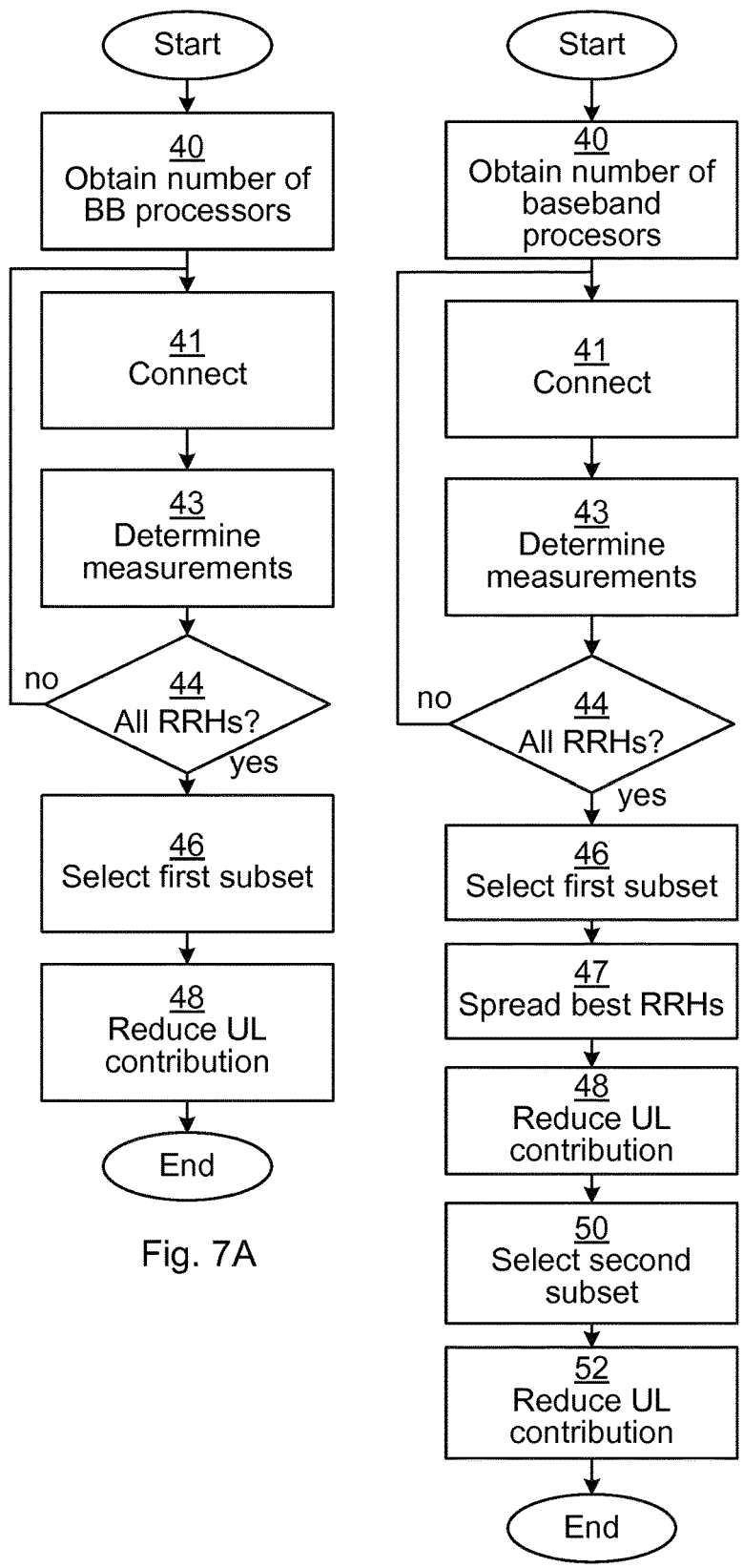
FIGS. 7A-B are flow charts illustrating embodiments of methods performed in the remote radio head controller of FIG. 1.

FIGS. 7A-B are flow charts illustrating embodiments of methods performed in the remote radio head controller of FIG. 1.

In an obtain number of BB processors step 40, a number of available baseband processor devices for uplink processing is obtained. Each available baseband processor device is connected to at least one combiner. There are optionally other baseband processor devices which are not available, e.g. which are not connected to any combiner.

In a connect step 41, uplink signals from a set of zero or more remote radio heads are connected in each one of the at least one combiner. In one embodiment, the set comprises at most one remote radio head. This simplifies measurement determination for a specific remote radio head since only one remote radio head is connected to a combiner, and thus a CPRI link, for the measurement determination.

In a determine measurements step 43, a respective radio channel measurement is determined for uplink radio communication from a first wireless device via the at least one combiner. This determination can e.g. be an estimation of SINR or path loss. For instance, when path loss is the measurement, this can also be used to select what remote radio heads to be used for downlink contributions to the wireless device, since path loss is of a reciprocal character.

Optionally, this step comprises determining a respective radio channel measurement for uplink radio communication from a second wireless device via the at least one combiner. This can be extended to a third, fourth, etc. wireless device if appropriate.

In a conditional all RRHs step 44, it is determined whether radio channel measurements for uplink communication from the wireless device have been determined for all of the plurality of remote radio heads. If this is the case, the method proceeds to select first subset step 46. Otherwise, the method returns to the connect step 41 to allow radio channel measurements to be determined for more remote radio heads.

In the select first subset step 46, a first subset of at least one remote radio head is selected from the plurality of remote radio heads for receiving radio communication from the first wireless device. This step can comprise including, in the first subset, only remote radio heads for which the radio channel measurements are better than a threshold value. Optionally, the one or more remote radio heads for which the radio channel measurements are the best are included in the first subset.

When the determine measurements step 43 is performed for more than one wireless device, the select first subset step 46 can comprise selecting a joint subset of at least one remote radio head for receiving radio communication from all of the wireless devices for which measurements were determined.

Optionally, when uplink random access reception is enabled for a period, all of the plurality of remote radio heads are in the first subset. In other words, in the uplink during the random access period, all remote radio heads contribute to the uplink signal to the baseband processor device.

In a reduce UL contribution step 48, an uplink contribution is reduced from at least one remote radio head, of the plurality of remote radio heads, which is not part of the first subset of at least one remote radio head. In one embodiment, this reduction of contribution comprises blocking such uplink contribution, e.g. using the switch 14 of FIGS. 5 and 6, and/or the cross switch 19 of FIG. 6.

Using this method, only the uplink signals from remote radio heads with sufficiently good measurements can be non-coherently combined in the combiner and and/or coherently combined in the baseband processor device.

In the uplink, this increases the combined SINR, or equivalently, the interference and noise figure will be reduced.

Looking now to FIG. 7B, only new or modified steps compared to the method illustrated by the flow chart of FIG. 7A will be described.

In a spread best RRHs step 47, a number of remote radio heads, corresponding to the number of available baseband processor devices, for which the radio channel measurement is best is connected to respective baseband processor devices. In other words, the best signals are spread to be used in different baseband processor devices.

In a select second subset step 50, a second subset of at least one remote radio head is selected from the plurality of remote radio heads for transmitting radio communication to the first wireless device.

In a reduce DL contribution step 52, a downlink contribution is reduced using at least one remote radio head, of the plurality of remote radio heads, which is not part of the second subset. Especially when path loss is used in the determine measurements step, this measurement is also applicable for downlink radio transmissions. Hence, the selection of remote radio heads for the downlink, using the second subset, can be utilised to avoid transmitting DL signals from remote radio heads which hardly contribute to better reception at the wireless device. This reduces interference for other wireless devices.

With reference to FIGS. 7A-B, a number of embodiments will now be described. Each of these embodiments can be combined with embodiments above as appropriate.

In a first embodiment, a size S of the first subset is determined. The first subset can be used such that its remote radio heads are turned on for data reception.

As explained earlier, SINR of the non-coherently combined signal in the combiner will be equal to a weighted average of individual SINRs of received signals at different remote radio heads. Therefore, ideally, the largest SINR can be achieved by turning on only the best remote radio head for UL data reception. However, the selection of the best remote radio head may be outdated or wrong due to signaling delay, fading fluctuation over time or channel estimation error. Therefore it will be good to turn on additional remote radio heads, whose SINRs are within a certain threshold from the largest SINR of the best remote radio head, for UL data reception in each combiner.

Assume that one cell contains J remote radio heads and L combiners, with L≥1 and M=(J/L) remote radio heads connected to each combiner, and each combiner is connected to one BBP in DU through a separate CPRI interface. It is also assumed that each remote radio head can be turned on or off on subframe level. Then at least one (the best) remote radio head from each group of M remote radio heads connected to one combiner shall be turned on for UL data reception to maximize the benefit of coherent combining of received signals at DU; that is, the size S of the selected remote radio head group for data reception shall be larger than or equal to L.

Moreover, more than one wireless device may transmit in the uplink in a given subframe, Hence, the remote radio head controller 8 can select, in the select first subset step 46, the joint subset of remote radio heads that is beneficial for each of the wireless devices that are scheduled to transmit in the uplink in a subframe. In the next subframe, another set of wireless devices may be transmitting, and the subset of remote radio heads which are activated may thus be different from the previous subframe.

Also, in subframes where random access transmission via Physical Random Access Channel (PRACH) is expected, all remote radio heads may be activated for reception, since the remote radio head controller 8 does not know the position of the RACH transmitting wireless device and it should therefore use all remote radio heads. The same procedure should be used when a wireless device is entering the cell after a handover or signaling for wireless device in idle mode. Hence, the remote radio head controller 8 dynamically changes between having all remote radio heads per combiner activated and having a subset of remote radio heads activated, depending of the type of transmissions in the subframe.

Therefore, the number of selected remote radio heads S depends on the number of available CPRIs in one cell, differences in SINR at remote radio heads of each wireless device, the number of co-scheduled wireless devices in the particular subframe, and whether the UL reception is for data or for PRACH. For simplicity in description in the following embodiments, we will focus on the scenario where one wireless device is scheduled for data transmission in one subframe when we determine the value of S.

In a second embodiment it is here described how to get individual SINR estimation of received signal at each remote radio head, and how to select first subset for data reception according to the SINR estimations.

Assume that one cell contains J remote radio heads and L combiners, with L≥1 and M=(J/L) remote radio heads connected to each combiner, and each combiner is connected to one BBP in DU through a separate CPRI. It is also assumed that each remote radio head can be turned on or off on subframe level. Note that a remote radio head being turned on means that the cable from the remote radio head is connected to the sum operation in the combiner device 15 of the combiner in FIG. 3. On the other hand, a remote radio head being turned off means that the cable from the remote radio head is not connected to the combiner device 15 of the combiner in FIG. 3. Then, from the previous embodiment we know that the size S of the selected remote radio head group for data reception shall be larger than or equal to L.

For individual SINR estimation, the cell can sequentially turn on L remote radio heads in the connect step 41, one from each group of M remote radio heads connected to one combiner, during the scheduled subframes to estimate SINRs in the determine measurements step 43 between a set of K wireless devices served by the cell and the L remote radio heads. The SINR estimation may for instance be based on SRS (Sounding Reference Signals) transmitted from the set of K wireless devices at the last symbols of the scheduled subframes. SINR estimation inside BBP can be done by for example using a time-domain based algorithm. To achieve the above, a combiner specific control signaling for selecting one remote radio head for SRS reception in each combiner is sent from the DU to each combiner before each scheduled subframe for SRS reception. Then with M scheduled subframes, the cell will perform J individual SINR estimations from received SRS between wireless device k and the J remote radio heads: SINR(k,j), for j=1, . . . , J. Note that with L available BBPs inside the DU for one cell, the cell can perform L individual SINR estimations between one wireless device and L remote radio heads at the same time.

The SRS transmissions from multiple wireless devices can be multiplexed in the time and frequency domains, where the periodicity, frequency comb, and bandwidth can be configured individually for each wireless device. In LTE, up to 8 orthogonal SRS transmissions can be code-division multiplexed (CDM) in the same bandwidth with different cyclic shifts of the same root extended ZC (Zadoff-Chu) sequence. To support SRS from an increasing number of antennas and wireless devices, aperiodic SRS (A-SRS) is introduced in LTE Release 10 to complement periodic SRS (P-SRS) in LTE Release 8. For A-SRS, the eNB (evolved node B) can dynamically schedule wireless devices for SRS transmission on demand.

SINR estimation of the received signal is one kind of channel quality estimation, and may be performed by a time-domain based algorithm for processing SRS transmitted from wireless devices. The received signal from remote radio head j containing SRS transmissions from K wireless devices is first processed by the cyclic prefix (CP) removal and serial-to-parallel (S/P) operation, and the resulting time-domain samples are transformed to frequency domain tones by discrete Fourier transform (DFT). After tone and comb demapping (demap), the resulting frequency-domain tones are element-wise multiplied by the conjugate of the root extended ZC sequence used by all K wireless devices, followed by inverse DFT (IDFT). The resulting time-domain samples from IDFT are cyclic shift de-multiplexed (demux)

for channel gain estimation and interference plus noise power estimation, followed by SINR estimation for each of the K wireless devices.

For the selection of the first subset in the select first subset step 46, first we consider the selection of the best remote radio heads from the M remote radio heads connected to the first combiner 5a. Assume that remote radio head 1, remote radio head 2, . . . , and remote radio head M are connected to the first combiner 5a. If SINR(k,j1)>SINR(k,j) for $1 \leq j \leq M$ and $j \neq j1$, meaning that among the M remote radio heads connected to the first combiner 5a, remote radio head j1 provides the best UL channel quality for wireless device k, remote radio head j1 shall be selected for UL data reception of wireless device k. Also, if SINR(k,j2) is within threshold_1 of SINR(k,j1), remote radio head j2 shall be selected too for UL data reception of wireless device k. The selected best remote radio heads for wireless device k then consists of S1 remote radio heads {remote radio head j1, remote radio head j2, . . . , remote radio head jS1}, where the SINRs of {remote radio head j2, . . . , remote radio head jS1} are all within threshold_1 of SINR(k,j1).

The selection continues for all users, k={1, . . . , K}, that are served by the remote radio heads connected to the combiner. Also, the selection of the best remote radio heads then continues for other combiners, if any. The selected remote radio head group for data reception is equal to the union of selected best remote radio heads from each group of M remote radio heads connected to one combiner. Then a combiner-specific control signaling for selecting remote radio head(s) for data reception in each combiner is sent from the DU to each combiner before each scheduled subframe for data reception.

For example in FIG. 5, we assume one cell has J=8 remote radio heads, L=2 combiners, M=(J/L)=4 remote radio heads connected to each combiner, and 2 CPRIs. To simplify the description, we use remote radio heads 1 to 8 to denote remote radio heads 1a, 1b, 1c, 1d, 1e, 1f, 1g and 1h, respectively. Two remote radio heads, one from {remote radio head 1, remote radio head 2, remote radio head 3, remote radio head 4} connected to the first combiner 5a and the other from {remote radio head 5, remote radio head 6, remote radio head 7, remote radio head 8} connected to the second combiner 5b, will be turned on sequentially for UL reception of SRS over the M=4 scheduled subframes: {0, 5, 10, 15}. Then 8 SINR estimations, SINR(k,j), j=1, . . . , 8, are generated by the cell from SRS transmission of wireless device k. For the 4 remote radio heads connected to the first combiner 5a, if SINR(k,1)>SINR(k,2)>SINR(k,3)>SINR(k,4) and only SINR(k,2) is within threshold_1 of SINR(k,1), remote radio head 1 and remote radio head 2 shall be selected for UL data reception for wireless device k. For the four remote radio heads connected to the second combiner 5b, if SINR(k,5)>SINR(k,6)>SINR(k,7)>SINR(k,8) and SINR(k,j), j=6, 7, and 8, is not within threshold_1 of SINR(k,5), only remote radio head 5 shall be selected for UL data reception for wireless device k. Then the remote radio head group {remote radio head 1, remote radio head 2, remote radio head 5}, with S=3, shall be selected for UL data reception for wireless device k later during scheduled subframes for data reception of wireless device k.

Assume that SINR(k,1)=SINR(k,2)=X dB, SINR(k,3) =SINR(k,4)=(X−20) dB, SINR(k,5)=SINR(k,6)=(X−40) dB, and SINR(k,7)=SINR(k,8)=(X−60) dB, where 20 dB, 40 dB and 60 dB represent the differences between path loss (remote radio head 1, wireless device k) and path loss (remote radio head 3, wireless device k), between path loss (remote radio head 1, wireless device k) and path loss (remote radio head 5, wireless device k), and between path loss (remote radio head 1, wireless device k) and path loss (remote radio head 7, wireless device k), respectively. We also assume that the interference plus noise condition is about the same at all remote radio heads. Then the SINR of the combined signal at DU is about X dB for a scheme where the first, second and fifth remote radio heads are combined, compared to about X−3 dB for the scheme where all remote radio heads are combined. Therefore, the difference in SINR (or the gain by using selected remote radio head group) is about 3 dB in this example.

In fact, the potential gain in SINR by using selected remote radio head group for data reception over the prior art (without selected remote radio head group for data reception) will be proportional to the number of remote radio heads in one combiner and the differences in individual SINRs at different remote radio heads. For example, for a combiner with eight remote radio heads and the individual SINR of the best remote radio head is much larger than individual SINRs of other remote radio heads, the gain in SINR by using selected remote radio head group for data reception can be as high as 9 dB.

In a third embodiment, to select one remote radio head for SRS reception or remote radio head(s) for data reception, the DU will send a combiner-specific control signaling to each combiner, as mentioned in the previous embodiment. The format of the combiner-specific control signaling is an M-bit vector, where M is the number of remote radio heads in each combiner. As for the contents of the signaling, a set bit in the M-bit vector means that the corresponding remote radio head shall be turned on for reception, while a clear bit means that the corresponding remote radio head shall be turned off instead. This scheme can of course be reversed.

In a fourth embodiment, the M-bit combiner specific control signaling can be sent through CPRI, from the DU to combiner in the DL direction, by utilizing the available DL bandwidth of CPRI. Compared with the typical 30 bits per CPRI time-domain sample (15 bits per real part and 15 bits per imaginary part) and 30720 CPRI time-domain samples per subframe for LTE with 20 MHz bandwidth, the overhead of sending M-bit control signaling for each combiner per subframe through CPRI is relatively low.

In a fifth embodiment, during each scheduled subframe for SRS transmission, the cell will receive user data, from wireless devices scheduled for data transmission, at symbols other than the last symbol of the scheduled subframe. However, with the assumption that each remote radio head can be turned on or off on subframe level, the L remote radio heads selected for SRS reception will be turned on during the whole scheduled subframe for SRS transmission. Then data reception from a wireless device during the same subframe will be suboptimal if the S remote radio heads in the selected remote radio head group for data reception for the wireless device are not the same as the L remote radio heads selected for SRS reception. In this scenario, wireless devices whose selected remote radio head group contains the L remote radio heads (selected for SRS reception) as a subset are preferred to be scheduled for UL data transmission during that scheduled subframe.

For example, assume that remote radio head 1 and remote radio head 5 are turned on for SRS reception during subframe 0. Then wireless devices with selected remote radio head group (for data reception) containing the remote radio head 1 and remote radio head 5 are preferred to be scheduled for UL data transmission during symbols other than the last symbol in subframe 0.

Such a suboptimal scenario can be avoided if each remote radio head can be turned on or off on SC-FDMA (Single-Carrier Frequency Division Multiple Access) symbol level; that is, the cell turns on L remote radio heads for SRS reception during the last symbol of the scheduled subframe, but the cell turns on the selected remote radio head group during other symbols of the scheduled subframe for data reception.

In a sixth embodiment, a dynamic connection between remote radio heads and combiners is proposed, as shown in FIG. 6, such that the SINR of the coherently-combined signal at the DU can be maximized for all wireless devices. Such dynamic connection is implemented using the cross switch 19, which dynamically arranges the connections between J remote radio heads and L combiners, and a control signaling, which controls the dynamic connections, from DU to the cross switch.

Assume that one cell contains J remote radio heads and L combiners, with L>1 and M=(J/L) remote radio heads connected to each combiner, and each combiner is connected to one BBP in DU through a separate CPRI. Data reception with selected remote radio head group and with the dynamic connection can be with reference to applicable steps of FIG. 7A.

In the connect step 41, the determine measurements step 43 and the conditional all RRHs step 44, individual SINR estimations are performed. The remote radio head controller sequentially turns on L remote radio heads, one from each group of M remote radio heads connected to one combiner, during the scheduled subframes for SRS transmission. However, before each scheduled subframe for SRS transmission, the remote radio head controller will trigger the DU to send a pre-defined fixed control signaling to the cross switch to configure the connections inside the cross switch. For example, the connections can be configured to be interleaved: {remote radio head 1, remote radio head 4, remote radio head 5, remote radio head 8} connected to the first combiner 5a and {remote radio head 2, remote radio head 3, remote radio head 6, remote radio head 7} connected to the second combiner 5b. The reason for using a fixed interleaved connection during each scheduled subframe for SRS transmission is (1) to ensure that individual SINRs of all the eight remote radio heads can be properly estimated after M=4 scheduled subframes for SRS transmission, where L=2 remote radio heads connected to L=2 different combiners are turned on during each scheduled subframe, and (2) to minimize the performance impact on the data reception during the same subframe. A format of the control signaling from the DU to the cross switch is shown in the next embodiment.

In the select first subset step 46, SINR estimations are compared and the first L best remote radio heads, in terms of SINR, are identified. Then each of the L best remote radio head is connected to one and only one combiner. If SINRs of any remaining remote radio heads are within threshold_1 dB of any of the L best SINRs, the corresponding remaining remote radio heads are also connected to combiners.

The remote radio head group selection is activated by sending an M-bit combiner-specific control signaling from the DU to each combiner. The M-bit combiner-specific control signaling is as defined in previous embodiment and is generated according to results of the comparison.

The dynamic connection inside the cross switch is then activated by sending a control signal from the DU to the cross switch. The control signal for the cross switch is generated according to results in comparison. That is, the control signaling is generated in such a way that each of the L best remote radio head is connected to one and only one combiner to maximize the SINR of the combined signal at DU. If S>L, the control signaling also instructs the cross switch to connect the other (S−L) remote radio heads to combiners.

For example, assume that the selected remote radio head group for the wireless device of FIG. 6 is {the first remote radio head to and the fourth remote radio head 1d}. Then the control signaling from the DU to the cross switch is generated such that first remote radio head and the fourth remote radio head are connected to the first combiner and the second combiner, respectively. Therefore, the SINR of the combined signal in DU will be maximized.

In a seventh embodiment, assume that one cell contains J remote radio heads and L combiners, with L>1 and M=(J/L) remote radio heads connected to each combiner. Then the number of all possible one-to-one connections between J remote radio heads and J LAN cables from the L combiners is J!, where J! is defined as J*(J−1)* . . . *2*1. However, all the M! possible connections within one combiner should be counted as one connection case, and the number of all possible connection cases becomes $J!/(M!)^L$. Therefore the format of the control signaling from the DU to the cross switch for dynamic connection in the previous embodiment is a N-bit vector, where N is the minimum number such that $2^N \geq J!/(M!)^L$.

TABLE 1

Example one of relations between LAN cable number and connection case number

| | | Connection case number | | | | | |
|---|---|---|---|---|---|---|---|
| | | 0 | 1 | 2 | 3 | 4 | 5 |
| LAN cable number | 1 | 1 | 1 | 1 | 2 | 2 | 3 |
| | 2 | 2 | 2 | 3 | 4 | 3 | 4 |
| | 3 | 3 | 4 | 2 | 1 | 4 | 4 |
| | 4 | 4 | 3 | 4 | 3 | 1 | 1 |
| | | | | | | | 2 |

In one example, a cell has L=2 combiners, J=4 remote radio heads, M=2 remote radio heads connected to each combiner, and J=4 LAN cables from the 2 combiners. The number of all possible connection cases between four remote radio heads and two combiners (with 4 LAN cables) is $4!/(2!)^2=6$, as shown in the Table 1. Inside Table 1, a number j means that remote radio head j is connected to the LAN cable in the corresponding row, where LAN cables 1 and 2 are from the first combiner 5a and LAN cables 3 and 4 are from the first combiner 5a.

TABLE 2

Example one of control signalling for the example of Table 1

| | Connection case number | | | | | |
|---|---|---|---|---|---|---|
| | 0 | 1 | 2 | 3 | 4 | 5 |
| N-bit control signalling with N = 3 | 0 | 0 | 0 | 0 | 1 | 1 |
| | 0 | 0 | 1 | 1 | 0 | 0 |
| | 0 | 1 | 0 | 1 | 0 | 1 |

Therefore N=3, and 3-bit control signaling is needed for setting up the type-1 dynamic connection between the 4 remote radio heads and 4 LAN cables, as shown in the example of Table 2. The mapping between the Table 1 and Table 2 is an example, and other mapping between the two tables is possible as long as it is a one-to-one mapping.

In another example, we assume that one cell has L=4 combiners, J=32 remote radio heads, M=8 remote radio heads connected to each combiner, and J=32 LAN cables from the 4 combiners. The number of all possible connection cases between 32 remote radio heads and 4 combiners (with 32 LAN cables) is $32!/(8!)^4$, and N=57 bits are needed for the control signaling. Therefore, compared with the typical 30 bits per CPRI time-domain sample (15 bits per real part and 15 bits per imaginary part) and 30720 CPRI time-domain samples per subframe for LTE with 20 MHz bandwidth, the overhead of sending N-bit control signaling per subframe for dynamic connection through CPRI is relatively low.

In an eighth embodiment, for the dynamic connection scheme in the sixth embodiment, the selection of remote radio heads and the dynamic connection are performed in separate devices, e.g. the combiner device in the combiner and the cross switch, respectively. One reason for performing the above two operations in two different places is that the same LAN cable is used for both DL transmission and UL reception. If the selection of remote radio heads is instead performed in the cross switch outside the combiners, the selection of remote radio heads for transmission will also be performed with the same selection for remote radio heads, which is not necessarily correct since the radio conditions in DL and UL may be quite different, especially if the selection is based on SINR which does not need to correspond for UL and DL. On the other hand, if path loss is used as basis for the selection, UL and DL can very well correspond to each other, in which case this is not a problem.

However, if DL transmission and UL reception are decoupled, for example by using different LAN cables for DL and UL, a second type of dynamic connection is proposed such that both the selection of remote radio heads and the dynamic connection are performed in the cross switch.

For the second type of dynamic connection, only one control signaling from DU to the cross switch is needed. Also, inside the cross switch, some remote radio heads are allowed not connected to any combiner, at least one remote radio head will be connected to one combiner, and at most M=(J/L) remote radio heads will be connected to one combiner.

Data reception with selected remote radio head group and with the second type of dynamic connection can be done in a similar way to what is described for the sixth embodiment above. However, for the second type of dynamic connection, only one control signal needs to be sent from the DU to the cross switch.

In a ninth embodiment, assume that one cell contains J remote radio heads and L combiners, with L>1. Then the following constraints hold for the second type of dynamic connection in previous embodiment: some remote radio heads are allowed not to be connected to any combiner, at least one remote radio head will be connected to one combiner, and at most M=(J/L) remote radio heads will be connected to one combiner. With the above constraints, the number of all possible connection cases between J remote radio heads and J LAN cables from the L combiners is $$J1 = \sum_{i1=1}^{M} \cdots \sum_{iL=1}^{M} \binom{J}{i1, \ldots, iL} = \sum_{i1=1}^{M} \cdots \sum_{iL=1}^{M} \frac{(J!)}{(i1)! \times \ldots \times (iL)! \times (J - i1 - \ldots - iL)!}$$ (1)

Therefore, the format of the control signaling from the DU to the cross switch for the second type of dynamic connection is a N-bit vector, where N is the minimum number such that $2^N \geq J1$.

TABLE 3

Example two of relations between LAN cable number and connection case number

| | | Connection case number | | | | | | | | | | | | | | | | | | | | | |
|---|---|---|---|---|---|---|---|---|---|---|---|---|---|---|---|---|---|---|---|---|---|---|---|
| | | 0 | | | | | 5 | | | | | 10 | | | | | 15 | | | | | 20 | |
| LAN cable number | 1 | 1 | 1 | 1 | 1 | 2 | 2 | 2 | 3 | 3 | 3 | 4 | 4 | 4 | 1 | 1 | 1 | 2 | 2 | 2 | 3 | 3 | 3 | 4 |
| | 2 | | | | | | | | | | | | | | | | | | | | | | | |
| | 3 | 2 | 3 | 4 | 1 | 3 | 4 | 1 | 2 | 4 | 1 | 2 | 3 | 2 | 2 | 3 | 1 | 1 | 3 | 1 | 1 | 2 | 1 |
| | 4 | | | | | | | | | | | | 3 | 4 | 4 | 3 | 4 | 4 | 2 | 4 | 4 | 2 |

| | | Connection case number | | | | | | | | | | | | | | | |
|---|---|---|---|---|---|---|---|---|---|---|---|---|---|---|---|---|---|
| | | | | 25 | | | | | 30 | | | | | 35 | | | 40 |
| LAN cable number | 1 | 1 | 4 | 4 | 1 | 1 | 1 | 1 | 1 | 1 | 2 | 2 | 2 | 2 | 3 | 3 | 1 | 1 | 1 | 2 | 2 | 3 |
| | 2 | | | | 2 | 2 | 3 | 3 | 4 | 4 | 3 | 3 | 4 | 4 | 4 | 4 | 2 | 3 | 4 | 3 | 4 | 4 |
| | 3 | 1 | 2 | 3 | 3 | 4 | 2 | 4 | 2 | 3 | 1 | 4 | 1 | 3 | 1 | 2 | 3 | 2 | 2 | 1 | 1 | 1 |
| | 4 | | 4 | 3 | 3 | | | | | | | | | | | | 4 | 4 | 3 | 4 | 3 | 2 |

TABLE 4

Example two of control signalling for the example of Table 3

| | Connection case number | | | | | | | | | | | | | | | | | | | | |
|---|---|---|---|---|---|---|---|---|---|---|---|---|---|---|---|---|---|---|---|---|---|
| | 0 | | | | | 5 | | | | | 10 | | | | | 15 | | | | | 20 |
| N-bit control signalling | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 1 | 0 1 | 0 1 | 0 1 | 0 1 |

TABLE 4-continued

Example two of control signalling for the example of Table 3

| | | | | | | | | | | | | | | | | | | | | | | |
|---|---|---|---|---|---|---|---|---|---|---|---|---|---|---|---|---|---|---|---|---|---|---|
| with N = 6 | 0 | 0 | 0 | 0 | 0 | 0 | 0 | 0 | 1 | 1 | 1 | 1 | 1 | 1 | 1 | 1 | 0 | 0 | 0 | 0 | 0 | 0 |
| | 0 | 0 | 0 | 0 | 1 | 1 | 1 | 1 | 0 | 0 | 0 | 0 | 1 | 1 | 1 | 1 | 0 | 0 | 0 | 0 | 1 | 1 |
| | 0 | 0 | 1 | 1 | 0 | 0 | 1 | 1 | 0 | 0 | 1 | 1 | 0 | 1 | 1 | 0 | 0 | 1 | 1 | 1 | 1 | 0 |
| | 0 | 1 | 0 | 1 | 0 | 1 | 0 | 1 | 0 | 1 | 0 | 1 | 0 | 1 | 0 | 1 | 0 | 1 | 0 | 1 | 0 | 1 |

| | Connection case number | | | |
|---|---|---|---|---|
| | 25 | 30 | 35 | 40 |

| | | | | | | | | | | | | | | | | | | | | | |
|---|---|---|---|---|---|---|---|---|---|---|---|---|---|---|---|---|---|---|---|---|
| N-bit control signalling with N = 6 | 0 | 0 | 0 | 0 | 0 | 0 | 0 | 0 | 0 | 0 | 1 | 1 | 1 | 1 | 1 | 1 | 1 | 1 | 1 | 1 |
| | 1 | 1 | 1 | 1 | 1 | 1 | 1 | 1 | 1 | 1 | 0 | 0 | 0 | 0 | 0 | 0 | 0 | 0 | 0 | 0 |
| | 0 | 0 | 1 | 1 | 1 | 1 | 1 | 1 | 1 | 1 | 0 | 0 | 0 | 0 | 0 | 0 | 0 | 0 | 1 | 1 |
| | 1 | 1 | 0 | 0 | 0 | 0 | 1 | 1 | 1 | 1 | 0 | 0 | 0 | 0 | 1 | 1 | 1 | 1 | 0 | 0 |
| | 1 | 1 | 0 | 0 | 1 | 1 | 1 | 0 | 1 | 1 | 0 | 0 | 1 | 1 | 1 | 0 | 1 | 1 | 0 | 0 |
| | 0 | 1 | 0 | 1 | 0 | 1 | 0 | 1 | 0 | 1 | 0 | 1 | 0 | 1 | 0 | 1 | 0 | 1 | 0 | 1 |

In Table 4 the content of the N-bit control signaling is shown for the example of Table 3 where one cell has L=2 combiners, J=4 remote radio heads, maximum M=2 remote radio heads connected to one combiner, and J=4 LAN cables from the 2 combiners. Inside Table 3, a number j means that remote radio head j is connected to the LAN cable in the corresponding row, where LAN cables 1 and 2 are from the first combiner 5a and LAN cables 3 and 4 are from the first combiner 5a. An empty entry inside Table 3 means that no remote radio head is connected to the LAN cable in the corresponding row. With the constraints described above, the number of all possible connection cases between 4 remote radio heads and 2 combiners (with 4 LAN cables) is J1=42, as shown in Table 3. This requires N=6, and 6-bit control signaling is needed for setting up the second type of dynamic connection between the four remote radio heads and four LAN cables, as shown in the Table 3. The mapping between the Table 3 and Table 4 is an example, and other mappings between the two tables are possible as long as it is a one-to-one mapping.

In a tenth embodiment, The N-bit control signaling for the various dynamic connections in previous embodiments can be sent through CPRI, from DU to combiner in the DL direction, by utilizing the available DL bandwidth of CPRI, as in the fourth embodiment. However, each instance of the control signaling the dynamic connection pertains to signalling from the DU to one combiner only, and from there the control signaling is sent to the cross switch.

Figure 8:
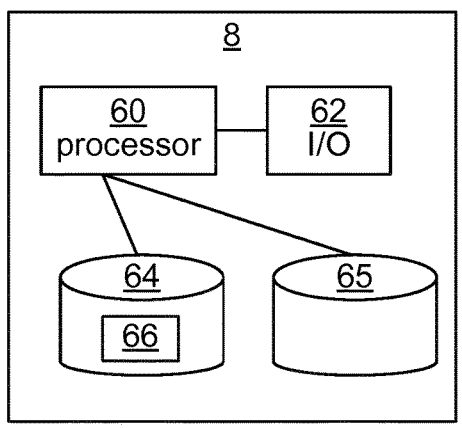
FIG. 8 is a schematic diagram showing some components of an embodiment of the remote radio head controller of FIG. 1.

FIG. 8 is a schematic diagram showing some components of an embodiment of the remote radio head controller 8 of FIG. 1. It is to be noted that when the remote radio head controller 8 forms part of a host device (e.g. a base station), one or more of the components shown in FIG. 8 may be shared with the host device if appropriate.

A processor 60 is provided using any combination of one or more of a suitable central processing unit (CPU), multi-processor, microcontroller, digital signal processor (DSP), application specific integrated circuit (ASIC) etc., capable of executing software instructions 66 stored in a memory 64, which can thus be a computer program product. The processor 60 can be configured to execute the methods described with reference to FIGS. 7A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory. The data memory 65 can e.g. store measurement values (e.g. SINR or path loss) for different RRHs for each active wireless device currently within the cell which the remote radio head controller 8 controls.

The remote radio head controller 8 further comprises an I/O interface 62 for communicating with other entities. Optionally, the I/O interface 62 also comprises a user interface for operator control of the remote radio head controller 8.

Other components of the remote radio head controller 8 are omitted in order not to obscure the concepts presented herein.

Figure 9:
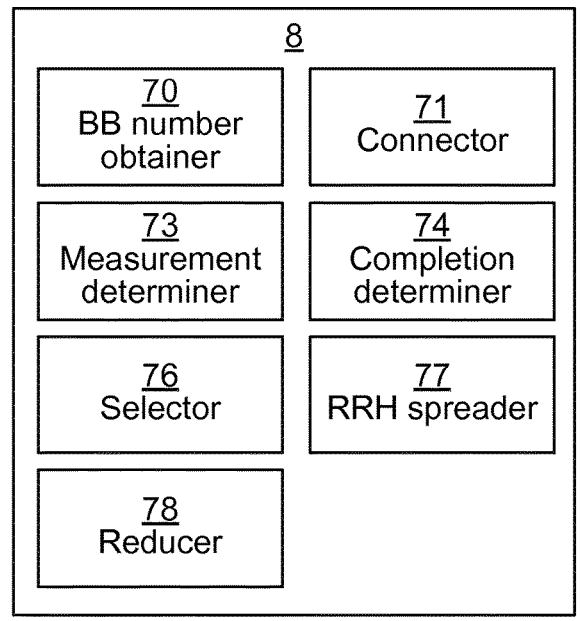
FIG. 9 is a schematic diagram showing functional modules of the software instructions of the remote radio head controller of FIG. 1 or FIG. 8 according to one embodiment.

FIG. 9 is a schematic diagram showing functional modules of the software instructions of the remote radio head controller 8 of FIG. 1 or FIG. 8 according to one embodiment. The modules are implemented using software instructions such as a computer program executing in the remote radio head controller 8. The modules correspond to the steps in the methods illustrated in FIGS. 7A-B.

A BB number obtainer 70 is arranged to obtain a number of available baseband processor devices for uplink processing, each available baseband processor device being connected to at least one of the at least one combiner. This module corresponds to the obtain number of BB processors step 40 of FIGS. 7A-B.

A connector 71 is arranged to connect uplink signals from a set of zero or more remote radio heads in each one of the at least one combiner. This module corresponds to the connect step 41 of FIGS. 7A-B.

A measurement determiner 73 is arranged to determine a respective radio channel measurement for uplink radio communication from the first wireless device via the at least one combiner. This module corresponds to the determine measurements step 43 of FIGS. 7A-B.

A completion determiner 74 is arranged to determine whether to repeat the instructions to connect and determine until radio channel measurements for uplink communication from the wireless device have been determined for all of the plurality of remote radio heads. This module corresponds to the conditional all RRHs step 44 of FIGS. 7A-B.

A selector 76 is arranged to select a first subset of at least one remote radio head from the plurality of remote radio heads for receiving radio communication from the first wireless device. This module corresponds to the select first subset step 46 of FIGS. 7A-B and the select second subset step 50 of FIG. 7B.

A RRH spreader 77 is arranged to connect a number of remote radio heads, corresponding to the number of available baseband processor devices, for which the radio channel measurements are best to respective baseband processor devices. This module corresponds to the spread best RRHs step 47 of FIG. 7B.

A reducer 78 is arranged to reduce an uplink contribution from at least one remote radio head, of the plurality of remote radio heads, which is not part of the first subset. This module corresponds to the reduce UL contribution step 48 of FIGS. 7A-B and the reduce DL contribution step 52 of FIG. 7B.

Figure 10:
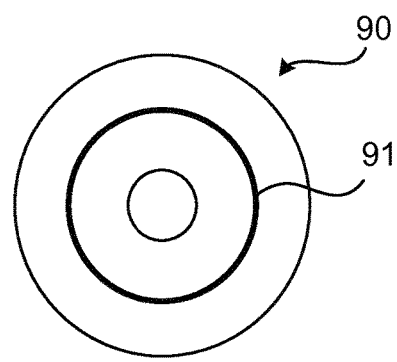
FIG. 10 shows one example of a computer program product comprising computer readable means.

FIG. 10 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 8. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling remote radio head contribution by a plurality of remote radio heads in at least one combiner, the method being performed in a remote radio head controller and comprising the steps of:
   obtaining a number of available baseband processor devices for uplink processing, each available baseband processor device being connected to at least one of the at least one combiner;
   connecting uplink signals from a set of one or more remote radio heads in each one of the at least one combiner,
   determining a respective radio channel measurement for uplink radio communication from a first wireless device via the at least one combiner;
   repeating the steps of connecting and determining until radio channel measurements for uplink communication from the wireless device have been determined for all of the plurality of remote radio heads;
   selecting a first subset of at least one remote radio head from the plurality of remote radio heads for receiving radio communication from the first wireless device; and
   reducing an uplink contribution from at least one remote radio head, of the plurality of remote radio heads, which is not part of the first subset.

2. The method according to claim 1, wherein the step of reducing an uplink contribution comprises blocking any uplink contribution from the at least one remote radio head which is not part of the first subset of at least one remote radio head.

3. The method according to claim 1, wherein in the step of connecting, the set comprises at most one remote radio head.

4. The method according to claim 1, wherein the step of selecting comprises including, in the first subset, only remote radio heads for which the radio channel measurements are better than a threshold value.

5. The method according to claim 1, wherein the step of selecting comprises including the remote radio head for which the radio channel measurement is the best.

6. The method according to claim 1, wherein the step of determining a respective radio channel measurement further comprises determining a respective radio channel measurement for uplink radio communication from a second wireless device via the at least one combiner; and
   the step of selecting a first subset of at least one remote radio head comprises selecting a joint subset of at least one remote radio head for receiving radio communication from both the first wireless device and the second wireless device.

7. The method according to claim 1, wherein the step of selecting a first subset of at least one remote radio head comprises including all of the plurality of remote radio heads in the first subset for a period when uplink random access reception is enabled.

8. The method according to claim 1, further comprising the step of:
   connecting a number of remote radio heads, corresponding to the number of available baseband processor devices, for which the radio channel measurements are best to respective baseband processor devices.

9. The method according to claim 1, further comprising the steps of:
   selecting a second subset of at least one remote radio head from the plurality of remote radio heads for transmitting radio communication to the first wireless device; and
   reducing a downlink contribution using at least one remote radio head, of the plurality of remote radio heads, which is not part of the second subset.

10. The method according to claim 9, wherein the first subset and the second subset are identical.

11. A remote radio head controller for controlling an uplink contribution for combining uplink radio signals from a plurality of remote radio heads in at least one combiner, the remote radio head controller comprising:
    a processor; and
    a memory storing instructions that, when executed by the processor, causes the remote radio head controller to:
       obtain a number of available baseband processor devices for uplink processing, each available baseband processor device being connected to at least one of the at least one combiner;
       connect uplink signals from a set of one or more remote radio heads in each one of the at least one combiner;
       determine a respective radio channel measurement for uplink radio communication from the first wireless device via the at least one combiner;
       repeat the instructions to connect and determine until radio channel measurements for uplink communication from the wireless device have been determined for all of the plurality of remote radio heads;
       select a first subset of at least one remote radio head from the plurality of remote radio heads for receiving radio communication from the first wireless device; and reduce an uplink contribution from at least one remote radio head, of the plurality of remote radio heads, which is not part of the first subset.

12. The remote radio head controller according to claim 11, wherein the instructions to reduce an uplink contribution comprise instructions that, when executed by the processor, causes the remote radio head controller to block any uplink contribution from the at least one remote radio head which is not part of the first subset.

13. The remote radio head controller according to claim 11, wherein the set comprises at most one remote radio head.

14. The remote radio head controller according to claim 11, wherein the instructions to select comprise instructions that, when executed by the processor, causes the remote radio head controller to include, in the first subset, only remote radio heads for which the radio channel measurement is better than a threshold value.

15. The remote radio head controller according to claim 11, wherein the instructions to select comprise instructions that, when executed by the processor, cause the remote radio head controller to include the remote radio heads for which the radio channel measurements are the best.

16. The remote radio head controller according to claim 11, wherein the instructions to determine a respective radio channel measurement comprise instructions that, when executed by the processor, cause the remote radio head controller to determine a respective radio channel measurement for uplink radio communication from a second wireless device via the at least one combiner; and
the instructions to select a first subset of at least one remote radio head comprise instructions that, when executed by the processor, cause the remote radio head controller to select a joint subset of at least one remote radio head for receiving radio communication from both the first wireless device and the second wireless device.

17. The remote radio head controller according to claim 11, wherein the instructions to select a first subset comprise instructions that, when executed by the processor, cause the remote radio head controller to include all of the plurality of remote radio heads in the first subset for a period when uplink random access reception is enabled.

18. The remote radio head controller according to claim 11, further comprising instructions that, when executed by the processor, cause the remote radio head controller to connect a number of remote radio heads, corresponding to the number of available baseband processor devices, for which the radio channel measurements are best to respective baseband processor devices.

19. The remote radio head controller according to claim 11, further comprising instructions that, when executed by the processor, cause the remote radio head controller to:
select a second subset of at least one remote radio head from the plurality of remote radio heads for transmitting radio communication to the first wireless device; and reduce a downlink contribution using at least one remote radio head, of the plurality of remote radio heads, which is not part of the second subset.

20. The remote radio head controller according to claim 19, wherein the first subset and the second subset are identical.

21. A remote radio head controller comprising:
one or more processors configured to:
obtain a number of available baseband processor devices for uplink processing, each available baseband processor device being connected to at least one of the at least combiner, each connected to one or more remote radio heads;
connect uplink signals from a set of one or more remote radio heads in each one of the at least one combiner;
determine a respective radio channel measurement for uplink radio communication from a first wireless device via the at least one combiner;
repeat the connecting and determining until radio channel measurements for uplink communication from the wireless device have been determined for all of the plurality of remote radio heads;
select a first subset of at least one remote radio head from the plurality of remote radio heads for receiving radio communication from the first wireless device; and
reduce an uplink contribution from at least one remote radio head, of the plurality of remote radio heads, which is not part of the first subset.

22. A computer program for controlling remote radio head contribution by a plurality of remote radio heads in at least one combiner, the computer program comprising computer program code, a non-transitory computer readable medium having the computer program code stored thereon executed by a processor which, where executed on a remote radio head controller, causes the remote radio head controller to:
obtain a number of available baseband processor devices for uplink processing, each available baseband processor device being connected to at least one of the at least one combiner;
connect uplink signals from a set of one or more remote radio heads in each one of the at least one combiner;
determine a respective radio channel measurement for uplink radio communication from the first wireless device via the at least one combiner;
repeat the computer program code to connect and determine until radio channel measurements for uplink communication from the wireless device have been determined for all of the plurality of remote radio heads;
select a first subset of at least one remote radio head from the plurality of remote radio heads for receiving radio communication from the first wireless device; and
reduce an uplink contribution from at least one remote radio head, of the plurality of remote radio heads, which is not part of the first subset.

* * * * *